April 26, 1960    S. J. DZIK    2,934,289
JETTISONABLE ATTACHMENT FOR AIRFOIL LIFT MODIFICATION
Filed Sept. 27, 1955    2 Sheets-Sheet 1
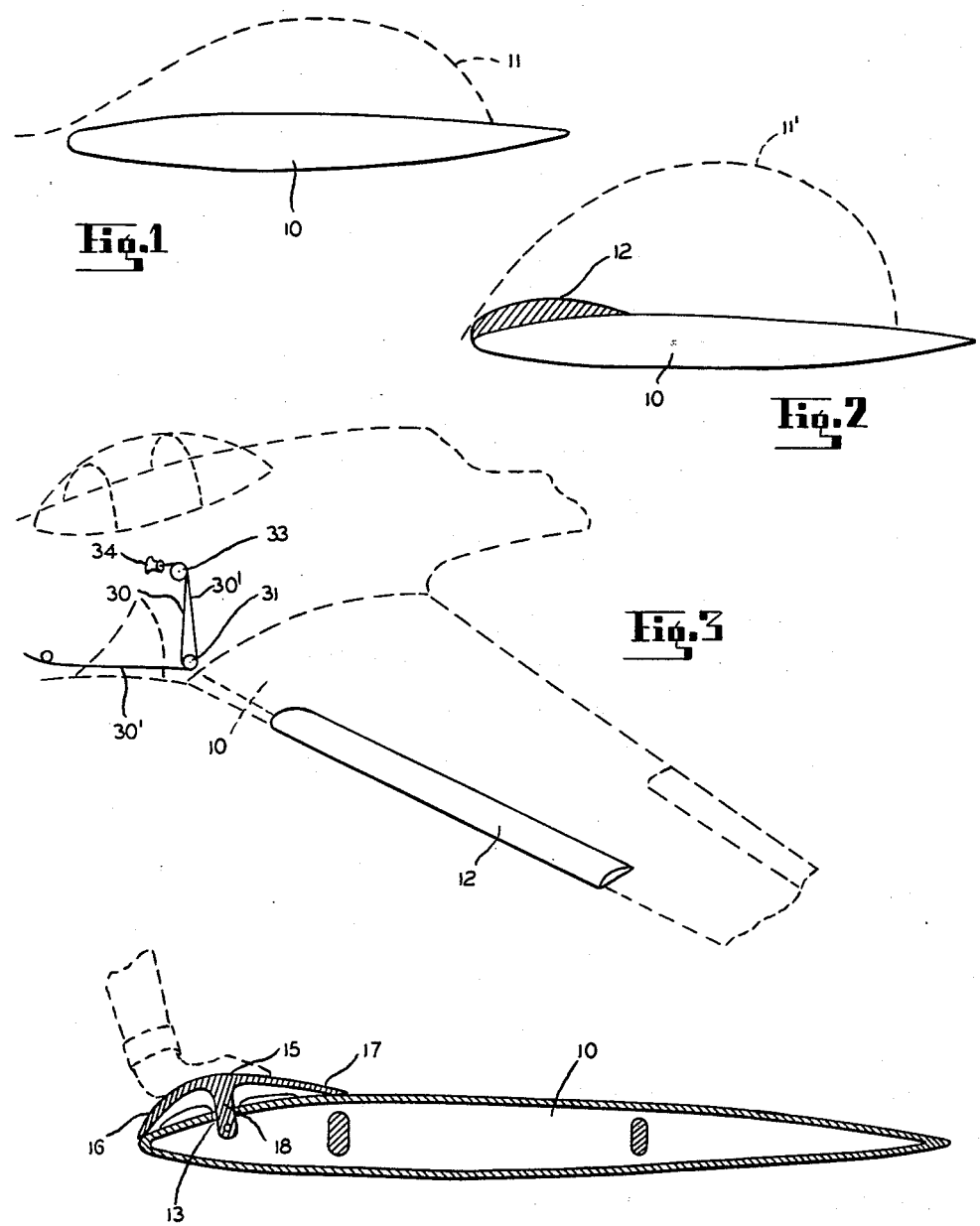
INVENTOR.
STANLEY J. DZIK
BY
PARKER & CARTER
ATTORNEYS April 26, 1960 S. J. DZIK 2,934,289
JETTISONABLE ATTACHMENT FOR AIRFOIL LIFT MODIFICATION
Filed Sept. 27, 1955 2 Sheets-Sheet 2

INVENTOR.
STANLEY J. DZIK
BY
PARKER & CARTER
ATTORNEYS

United States Patent Office 2,934,289
Patented Apr. 26, 1960

2,934,289

JETTISONABLE ATTACHMENT FOR AIRFOIL LIFT MODIFICATION

Stanley J. Dzik, Milwaukee, Wis., assignor of one-half to Leo Geib, West Bend, Wis.

Application September 27, 1955, Serial No. 536,869

5 Claims. (Cl. 244—44)

My invention relates to an aircraft accessory and more particularly to a jettisonable auxiliary unit for engagement with the airfoil sections of an aircraft.

The object of my invention is to provide a device adaptable for releasable mounting on the airfoil sections of an aircraft to improve the lifting performance of the airfoil sections during take-off.

Another object of my invention is to provide a device of the character described that may be easily attached to the airfoil sections in such a manner that it may be released from inside of the cabin, making it possible to jettison the attached device for disposal after suitable altitude and flying speed have been attained.

A further object of my invention is to provide a device that will render positive, efficient and improved results when the thin airfoil sections do not create suitable lifting efficiency at relatively low take-off speeds.

The device is primarily designed for use with aircrafts equipped with thin airfoil sections of the form especially adapted for sonic speed performance.

It is an established fact that aircraft designed with a thin airfoil section have a chord datum line at zero and in most cases negative up to two or more degrees from the horizontal center line of the craft.

This design results in unsatisfactory aerodynamic efficiency at the take-off, and necessitates longer runways. or ramps, and increased speed.

The device described and illustrated herein enables the craft to carry heavier payloads and will increase the lift of the craft at the take-off. It may easily be attached to the airfoil sections and may easily be jettisoned when a predetermined altitude and speed have been attained, and may be readily adapted to fit any type of thin airfoil section of an aircraft.

The prime object and purpose therefore of the device is to provide greater lifting efficiency in times of an emergency when an overloaded aircraft requires maximum lifting efficiency, on short runways when lifting heavily overloaded aircrafts, over mountainous terrain, etc. The device is especially designed for mounting in direct overlapping engagement on an airfoil section in a manner which will permit its jettisoning or disposal after its function has been performed and while the aircraft is in flight.

The device is simple in construction easy to manufacture and is readily attached to, and detached from, the airfoils of an aircraft.

Other and further objects of my invention will become more apparent as the description proceeds when taken in conjunction with the drawings in which:

Figure 1 is an outline of a conventional thin airfoil section showing the normal lift chart in dotted lines.

Figure 2 is an outline of a conventional thin airfoil section as shown in Figure 1, and with the device of my invention indicated in cross-section as attached to the forward edge of the airfoil.

Figure 3 is a perspective view of the device attached to the airfoil of an aircraft which is shown in phantom.

Figure 4 is an enlarged transverse cross sectional view of the thin airfoil, showing the manner in which the device may be forced into position while attaching.

Figure 5:
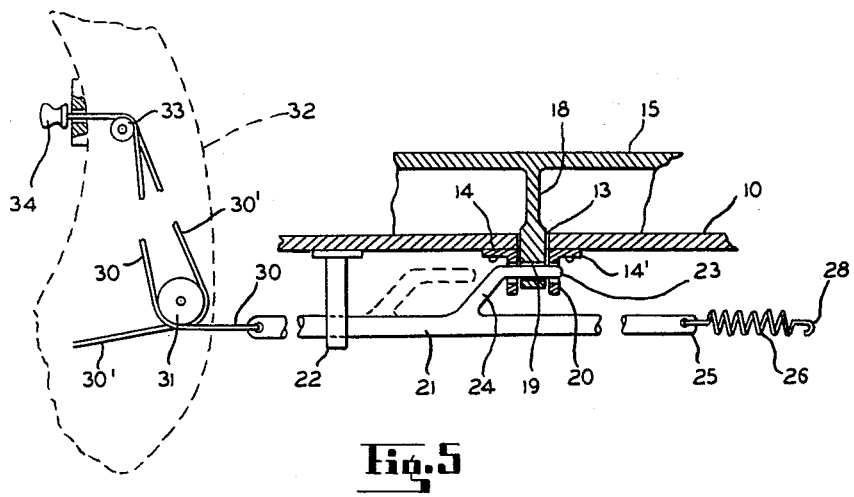
Figure 5 is a fragmentary cross section illustrating the mechanism for locking and releasing the device, with parts broken away.

Referring now to details of the embodiment of my invention illustrated in the drawing, 10 shows a conventional thin airfoil or wing as shown in Figure 1. The normal lift is indicated roughly by a dotted line 11. The device of my invention is indicated by the cross sectioned area 12, which is detachably mounted in direct overlapping engagement along and above the forward edge of an airfoil 10, as shown in Figure 2. The modified lift attained is indicated by the dotted line 11'.

As shown in detail in Figures 4 and 5, the airfoil 10 is provided with a plurality of similar openings 13 spaced along the top front edge thereof, which openings have a pair of downwardly and inwardly disposed guide members 14 and 14', spaced longitudinally of the airfoil and extending into the enclosure of the airfoil 10.

The device 12 per se, consists of an upper plate member 15 generally convex in transverse cross section, having an approximately radial contour 16 along its forward end and a relatively flattened area 17 at its rear end. The plate 15 is constructed of thin sheet material having sufficient resilience, especially along its longitudinal edges, to be forced into close yielding engagement with the adjacent surface of the airfoil when mounted thereon, as will presently be described. The plate 15 with its top surface has a plurality of downwardly disposed longitudinally spaced arms 18 attached to its under face, herein shown as being formed integrally therewith, so as to be engaged within the openings 13 along the top of the airfoils 10. The arms 18 are provided with laterally disposed apertures shown as 19, and the guide members 14 and 14' are also equipped with openings 20, which are in parallel relation and oppositely disposed from one another.

Suitable means are provided controllable from the cockpit, for releasably securing the devices to their airfoils. In the form shown herein, this means includes a rod 21 extending longitudinally within each of the airfoils 10 and supported by bearing members 22 in Figure 5. These rods have pins 23 extending longitudinally thereof and attached to the rods 21 at 24. The pins 23 are disposed for slidable engagement through the apertures 19 and 20 in the arms 18, and the guide members 14 and 14' respectively, when the entire device 12 is applied to the upper surface of the airfoil 10 and forced downward to the position where the pin 23 can engage the apertures as stated above. One end 25 of each rod 21 may be attached to a resilient member 26 herein consisting of a coil spring. This resilient member 26 is suitably attached as at 28 to the inside of the airfoil 10 so as to urge the pin 23 into yielding engagement with the apertures in the arms 18 and the guides 14 and 14'. The opposite end of each rod 21 has a cable 30 attached thereto, which extends over a pulley 31, which pulley is suitably journalled on the fuselage indicated at 32. The cable 30 extends over another pulley 33 also attached to the fuselage 32, to a pull knob suitably located inside of the cabin of the fuselage 32 in position to be accessible to the pilot. Similar cable 30' extends to a second control rod similar to the rod 21, mounted in a similar manner within the oppositely disposed airfoil 10. When the knob 34 is pulled, both rods 21 will move longitudinally within the bearings 22, thereby permitting the pins 23 to be disengaged from the apertures 19 and 20 in the arms 18, and the guide members 14 and 14' respectively, thereby permitting both devices 12 to be released and be jettisoned from the aircraft at the same time while the latter is in flight.

Manifestly, other well known means may be provided for controlling the release of the devices, such as electric or hydraulic actuators, together with auxiliary manually controlled devices in case of electric or hydraulic power failure.

The device may be constructed economically of metal or of suitable molded plastic material and will not create an unreasonable expense in construction or attachment, or hazard when released.

Although I have shown and described a certain embodiment of the invention, it will be understood that various changes and modifications may be made without departing from the spirit and scope of the invention as defined in the appended claims.

I claim:

1. In a jettisonable unit for an airfoil section of an aircraft, which section normally has relatively low aerodynamic lift efficiency at low speeds, comprising an elongated plate member generally convex in transverse cross section, means for detachably connecting said plate member in direct overlapping engagement along and above the front edge of the airfoil section to increase the effective lift of said airfoil section at relatively low speeds, and means for releasing said detachable connecting means to cause said plate member to be jettisoned as a unit at relatively higher speeds by the airstream while the aircraft is in flight, the jettisonable plate member being formed of sheet material, with flexible front and rear edges and the detachable connecting means being disposed between said front and rear edges, whereby the plate is held under tension by the detachable connecting means against the contiguous surfaces of the airfoil section.

2. A jettisonable unit in combination with an airfoil section, which section normally has relatively low aerodynamic lift efficiency at low speeds, comprising an elongated member having a forward edge and a rear edge, said forward edge being formed to fit along and against the leading edge of the airfoil section and the rear edge being formed to fit along an upper surface of said section at a location rearwardly of said leading edge, said member having an outer surface of generally convex cross section extending between said edges, means detachably connecting said member to said section, and operator controlled means for releasing said detachable connection to allow said member to be jettisoned by the air stream while the aircraft is in flight.

3. The structure defined in claim 2 wherein said member is curved on a flatter arc toward its rear edge than its forward edge.

4. The structure defined in claim 2 wherein said detachable connecting means includes a lug carried on the inner surface of said member and having an aperture for releasably receiving a pin carried by said section.

5. The structure defined in claim 2 wherein said member has flexible front and rear edges for engagement with the contiguous surfaces of said section.

References Cited in the file of this patent

UNITED STATES PATENTS

| | | |
|---|---|---|
| 1,559,090 | Hall | Oct. 27, 1925 |
| 2,727,706 | Heilig | Dec. 20, 1955 |

FOREIGN PATENTS

| | | |
|---|---|---|
| 330,003 | Germany | Dec. 6, 1920 |
| 441,074 | Great Britain | Jan. 13, 1936 |
| 847,541 | France | July 3, 1939 |
| 1,003,239 | France | Nov. 14, 1951 |